United States Patent [19]
Loyer et al.

[11] Patent Number: 5,291,427
[45] Date of Patent: Mar. 1, 1994

[54] METHOD FOR ASSISTING THE DEVELOPMENT OF A SET OF COMMUNICATING AUTOMATA

[75] Inventors: Bernard Loyer, Pleumeur Bodou; Catherine Colin, Begard, both of France

[73] Assignee: Alcatel N.V.

[21] Appl. No.: 914,115

[22] Filed: Jul. 15, 1992

[30] Foreign Application Priority Data

Jul. 16, 1991 [FR] France .................. 91 08985

[51] Int. Cl.$^5$ .................. G06G 7/48; H04J 15/00
[52] U.S. Cl. .................. 364/578; 364/514; 364/DIG. 2
[58] Field of Search .................. 364/578, 514, DIG. 2

[56] References Cited

U.S. PATENT DOCUMENTS

| | | | |
|---|---|---|---|
| 4,354,226 | 10/1982 | Flickinger et al. | 395/200 |
| 4,876,664 | 10/1989 | Bittorf et al. | 395/200 |
| 4,998,194 | 3/1991 | Okamato et al. | 364/133 |
| 5,163,016 | 11/1992 | Har'el et al. | 364/578 |

OTHER PUBLICATIONS

"PROTEAN: A High-level Petri Net Tool for the Specification and Verification of Communication Protocols," *IEEE Transactions on Software Engineering*, vol. 14, No. 3, Mar. 1988, Jonathan Billington et al.

*Primary Examiner*—Kevin J. Teska
*Assistant Examiner*—Jae H. Choi
*Attorney, Agent, or Firm*—Robbins, Berliner & Carson

[57] ABSTRACT

In a method for assisting with the development of a set of communicating automata a development machine is supplied with a description of initial elementary Petri nets respectively modeling partial behaviors of each function. The development machine is then used to verify that each initial net has the required properties. The development machine is then told a plurality of nets to be combined and a communication mode. The development machine is then used to verify that the net resulting from this combination has the required properties. The initial Petri nets are then modified if the net obtained does not have the required properties. The development machine is again told a plurality of nets to be combined and a communication mode to cause it to carry out a series of combinations and verifications until Petri nets are obtained having the required properties and respectively modeling each automaton of the set and communication between inter-automaton interfaces or between an external interface and the environment external to the set of automata.

7 Claims, 6 Drawing Sheets

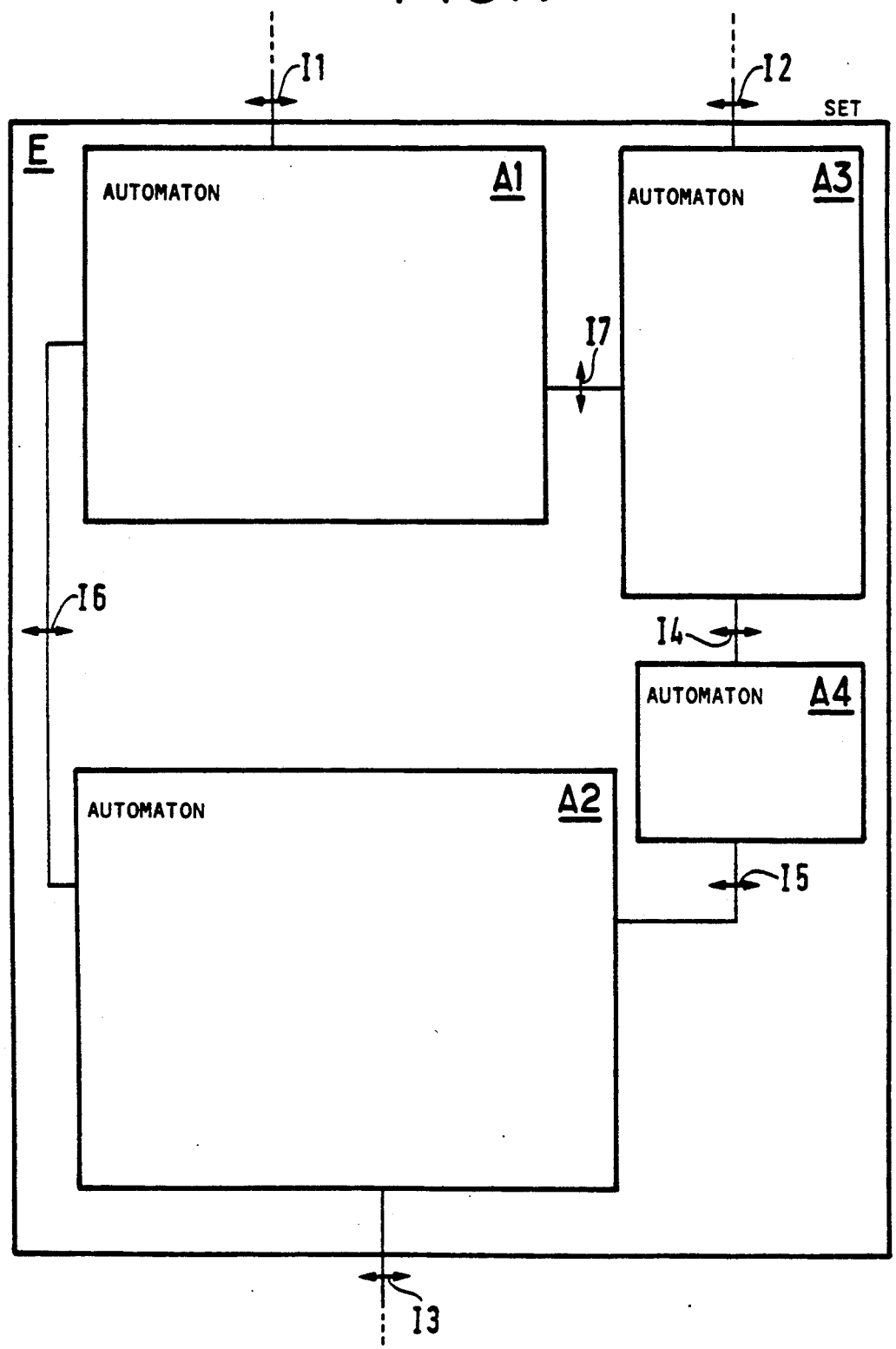

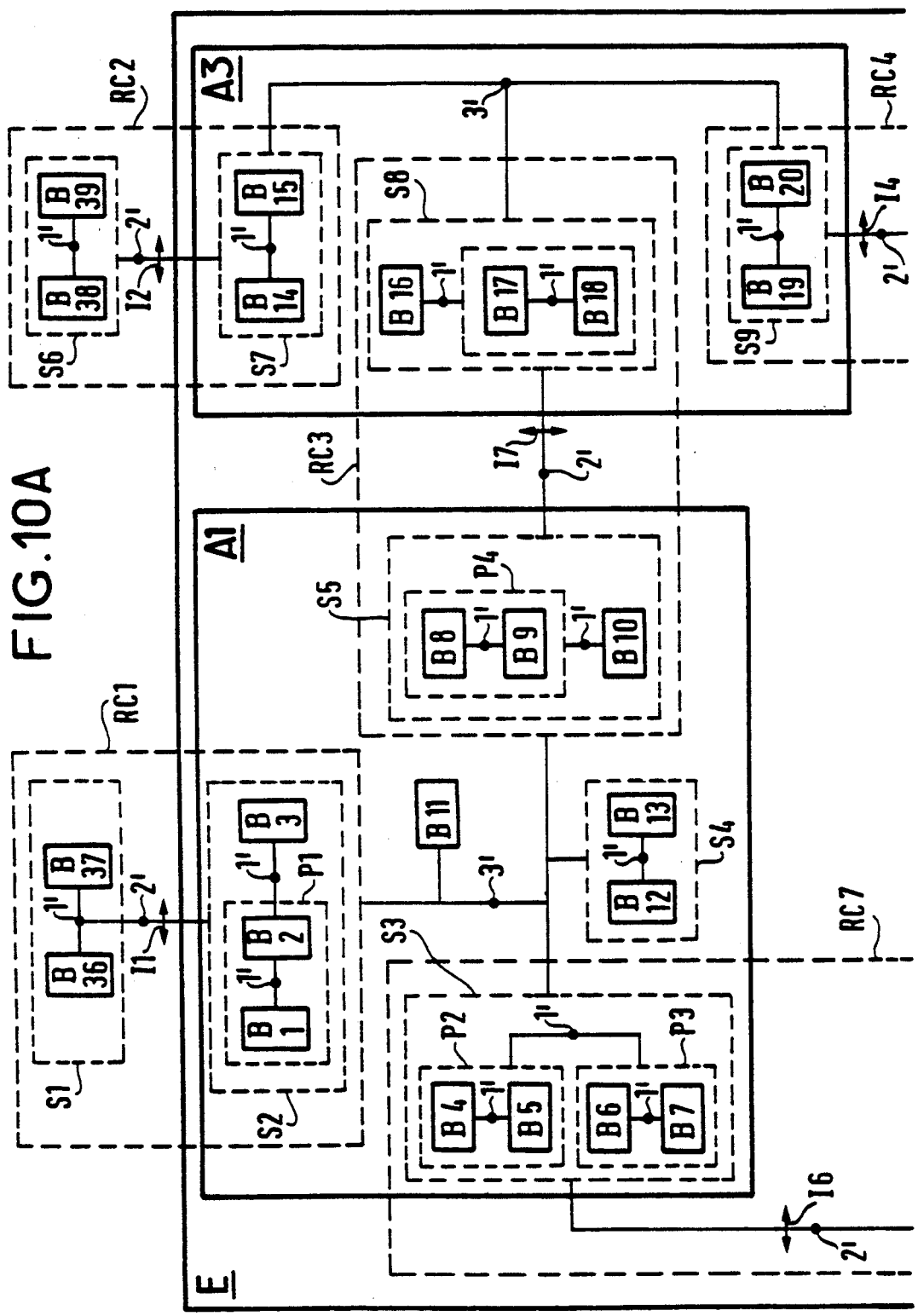

METHOD FOR ASSISTING THE DEVELOPMENT OF A SET OF COMMUNICATING AUTOMATA

BACKGROUND OF THE INVENTION

1. Field of the Invention

The invention concerns a method for assisting the development of a set of communicating automata implemented either as software in a data processing machine or as a hardwired logic circuit. The method is more particularly directed to the design of telecommunication systems which includes call processing applications for a switching center. A call processing application runs in real time and comprises a large number of communicating automata processing a plurality of interleaved messages.

The development of any such set of automata involves: firstly, a human designer; secondly, a development machine which is a general-purpose computer on which software for assisting the development of a set of communicating automata is installed; and thirdly, a target machine on which the software implementing the set of communicating automata will be installed. In the case of a telecommunication system, the target machine is the multiprocessor control unit of a switching center, for example. In this case each automaton is implemented entirely in one processor but one processor may support a plurality of automata.

2. Description of the Prior Art

The designer of a set of communicating automata constituting a call processing application, for example, starts with a defined set of functions that the application is to implement. The behavior of each function will be defined by one automaton. The designer is familiar with the external and internal interfaces of the set of automata. The development of a set of communicating automata comprises four stages:

writing a specification for a set of communicating automata, on the basis of the required functions, the communicating automata being intended to be implemented as software in the target machine but to be modeled on the development machine;

analyzing the automata and their communications via their interfaces using the development machine model;

implementing the communicating automata as software in the target machine;

validating the software in the target machine.

It is known to use formal description techniques to design a set of communicating automata because of the powerful resources that they offer. In particular, use is made of certain specialized languages whose semantics are based on mathematical models. These languages also have provision for some verification, but the methods of using these languages are not well suited to highly complex systems such as telecommunication systems.

The Petri net modeling technique is described in the article: "Modelling and Analysis of Communication and Cooperation Protocols Using Petri nets Based Models" North Holland Publishing Company Computer Nets 6 (1982) pages 419-441.

The Petri net technique is an extension of the finite state sequential automaton technique using state and transition concepts. A transition models the passage of the system from a stable state to another stable state. The novelty of Petri nets is essentially that transitions no longer link global states of a system but partial states (called "places") enabling synchronization to be expressed. A number of tokens can exist in these places. Each configuration of the tokens represents a different global state. The Petri net technique can represent a set of a large number of states and a large number of transitions of an automaton and in particular synchronization between automata.

If the Petri net technique is used to develop an application, the specification for the application consists in a description in the form of a Petri net of:

the places and an initial configuration of the tokens, for the initial global state; and transitions associated with the places and with events, each event firing or being the consequence of a transition and the events representing the interface between the application and its external environment.

Analysis entails verifying properties required by the designer, in particular the overall consistency of the resulting Petri net, that is to say that it has the minimal properties of a Petri net, and looking for constantly true properties called invariants. An analysis is exhaustive if it consists in a search for all the states, in particular to verify that each state is reachable and that each transition is living. The search for invariants verifies the Petri net structure and determines certain properties specific to the modeled application.

The set of reachable states is called a reachability graph and constitutes an automaton representing the application to be developed.

Implementation on the target machine follows on directly from the modeling in Petri net form during the specification stage, in so far as synchronization is concerned. It remains to write series of instructions representing actions associated with the transitions of the Petri net model.

Validating the software entails defining and then executing test sets. These are conventionally defined by the designer.

The known method has the following drawbacks when it comes to developing a complex application comprising a large number of places and a large number of transitions:

it is very difficult for the designer to describe the overall behavior of the application using only one Petri net;

the exhaustive analysis of the net requires development machine computer time and memory capacity which can quickly become prohibitive;

debugging is difficult and entails repeating the analysis many times.

An object of the invention is to propose a method for assisting the development of a set of communicating automata which is free of the above drawbacks.

SUMMARY OF THE INVENTION

The present invention consists in a method for assisting with the development of a set of communicating automata comprising a plurality of interfaces which process a plurality of interleaved messages, said automata being developed from interfaces external to the set, inter-automaton interfaces, the function that each automaton of the set must implement and the function to be implemented by the environment external to each interface external to the set, which method comprises the following stages:

supplying to a development machine a description of initial elementary Petri nets respectively modeling partial behaviors of each function by describing events which fire or are consequences of transitions in each initial Petri net and assigning a label to each transition dependent on at least one event, each event firing or being a consequence of said transition, said events representing interfaces external to the set of automata, inter-automaton interfaces and interfaces between the initial nets;

verifying on said development machine that each initial net has the required properties;

supplying to said development machine a description of constraints between initial nets representing the behavior of the environment external to the set of automata;

notifying to said development machine a plurality of nets to be combined and a communication mode to cause it to combine initial Petri nets with each other or with Petri nets replacing initial nets previously combined or to combine nets replacing initial nets previously combined, each combination being effected by causing to communicate at least two nets using the labels of their transitions in the notified communication mode, which is chosen from the following modes:

a synchronous mode;

an asynchronous mode;

a pseudo-synchronous mode in which events constituting communication with the environment external to the net resulting from the combination are synchronous with the environment external to the nets to be combined and asynchronous within the nets to be combined, each pseudo-synchronous mode combination allowing for internet constraints;

causing said development machine to verify that the net resulting from said combination has the required properties;

supplying to the development machine a description of modified initial nets replacing initial nets to be combined if the net obtained by combining the initial nets does not have the required properties; and notifying again to said development machine a plurality of nets to be combined and a communication mode to cause it to carry out a series of combinations and verifications until Petri nets are obtained having the required properties and respectively modeling each communication between two inter-automaton interfaces or between an external interface and the environment external to the set of automata and each automaton of the set.

An advantage of this method is that the human designer of a complex set of communicating automata need only design and manipulate elementary Petri nets, i.e. nets comprising only a few places and transitions. The combination of elementary Petri nets and the combination of Petri nets replacing initial nets previously combined provides a way of modeling a set of automata much more complex than any that could be modeled using a global Petri net or a formal description language based on modeling by automata.

The method can be used to design a set of communicating automata by exhaustively analyzing Petri nets modeling the automata without requiring prohibitive computer time and memory capacity because the required properties are verified in stages as initial Petri nets are combined and without going so far as Petri net modeling all of the automata.

An automaton developed using a method in accordance with the invention is implemented by writing a series of instructions for each transition of the elementary Petri net. The number of transitions is greater than that obtained for modeling with a single Petri net because of the combination of nets. This large number of transitions facilitates the writing of series of instructions representing actions associated with the transitions since the increase in the number of transitions goes hand in hand with a simplification of the actions associated with the transitions. In other words, each action is accomplished by a smaller number of instructions. These series of instructions also have the advantage of being executed linearly, in other words without branching. They are therefore easy to debug.

Validation of the software implementing the set of automata is simple because, the consistency of the states and the transitions having been verified before installation on the target machines, it remains only to verify the series of instructions representing actions associated with the transitions.

Testing is simple because it can also be effected in stages. It entails running comprehensively through the set of transitions of the automaton derived from the Petri net for each automaton and for each communication. These transitions can then be reduced in number against selection criteria in order to reduce the number of tests.

A final advantage of this method is that it facilitates maintenance of a set of automata designed using the method. No modification or extension of the set of automata should degrade the consistency of the whole. To meet this condition it is necessary to repeat the method in accordance with the invention from the beginning, i.e. from the description of the initial elementary Petri nets. This could seem to be a constraint, but in fact it guarantees the quality of the software finally obtained after such maintenance operations.

According to a subsidiary feature of the invention, synchronous communication mode combination comprises merging all transitions belonging to two nets to be combined and whose labels share a common event which:

is a consequence of one of the transitions and fires another transition; or is a common consequence of the transitions; or fires all the transitions.

According to another subsidiary feature of the invention, asynchronous communication mode combination comprises:

linking first and second nets to be combined by means of one queue in each communication direction; and imposing temporary constraints on the communication protocol using the two queues throughout the duration of the verification of the required properties of the resulting net obtained by combining the two nets to be combined and the two queues.

According to another subsidiary feature of the invention, the combination of a plurality of nets using the pseudo-synchronous communication mode comprises:

linking the nets using a single queue having a plurality of inputs respectively connected to an output of each of the nets to be combined and a plurality of outputs respectively connected to an input of each of the nets to be combined;

imposing a permanent constraint giving events from said queue priority over events from interfaces external to the net obtained to fire transitions in the nets to be combined; and imposing temporary inter-net constraints only during the verification of the properties required of the Petri net modeling the behavior of an automaton and consisting in adding conditions for firing transitions of one of the nets to be combined, these conditions relating to the status of the other nets to be combined and representing the behavior of the environment of the resulting net.

According to another subsidiary feature of the invention, the initial Petri nets each comprise at most one interface external to an automaton and the combination of the initial elementary Petri nets comprises the following three stages in this order:

a first stage comprising: combining nets two by two using the synchronous communication mode to obtain Petri nets replacing initial nets and comprising at most one interface external to an automaton; verifying that the nets obtained have the required properties; and repeating the first stage for nets which have been combined where the resulting net does not have the required properties;

a second stage comprising, for each interface external to an automaton: combining two by two using the asynchronous communication mode Petri nets obtained from the first stage and having a common inter-automaton interface or interface external to the set of automata to obtain from each such combination a Petri net modeling communication between two inter-automaton interfaces or between an interface external to an automaton and the environment of the set of automata; verifying that the nets obtained have the required properties; and repeating the first stage for nets that have been combined and for which the resulting net does not have the required properties; and a third stage comprising: using the pseudosynchronous communication mode to combine Petri nets obtained from the first stage and validated by the second stage allowing for inter-initial net constraints representing the behavior of the environment external to the set to obtain for each automaton a Petri net modeling the function of said automaton, in particular communication between the nets obtained from the first stage; verifying that the nets obtained have the required properties; and repeating the first and second stages for nets which have been combined and for which the resulting net does not have the required properties.

This mode of implementing the method in accordance with the invention reduces the problems of debugging a set of automata because the first step makes it possible to combine all of the initial nets related to the same inter-automaton interface or to the same interface external to an automaton, or which have the common feature of not being tied to any interface, so that communication between each automaton and its environment can be debugged independently. The second stage solves these problems independently for each communication. The third stage is used to debug communications internal to an automaton independently of the others.

Further details of the use of a method in accordance with the invention will emerge from the following description given with reference to the accompanying drawings.

BRIEF DESCRIPTION OF THE DRAWINGS

FIGS. 9, 10a and 10b show a preferred embodiment of the invention comprising three successive steps during which the communication modes used in succession are: synchronous, asynchronous, pseudo-synchronous.

DETAILED DESCRIPTION OF THE INVENTION

Figure 1:
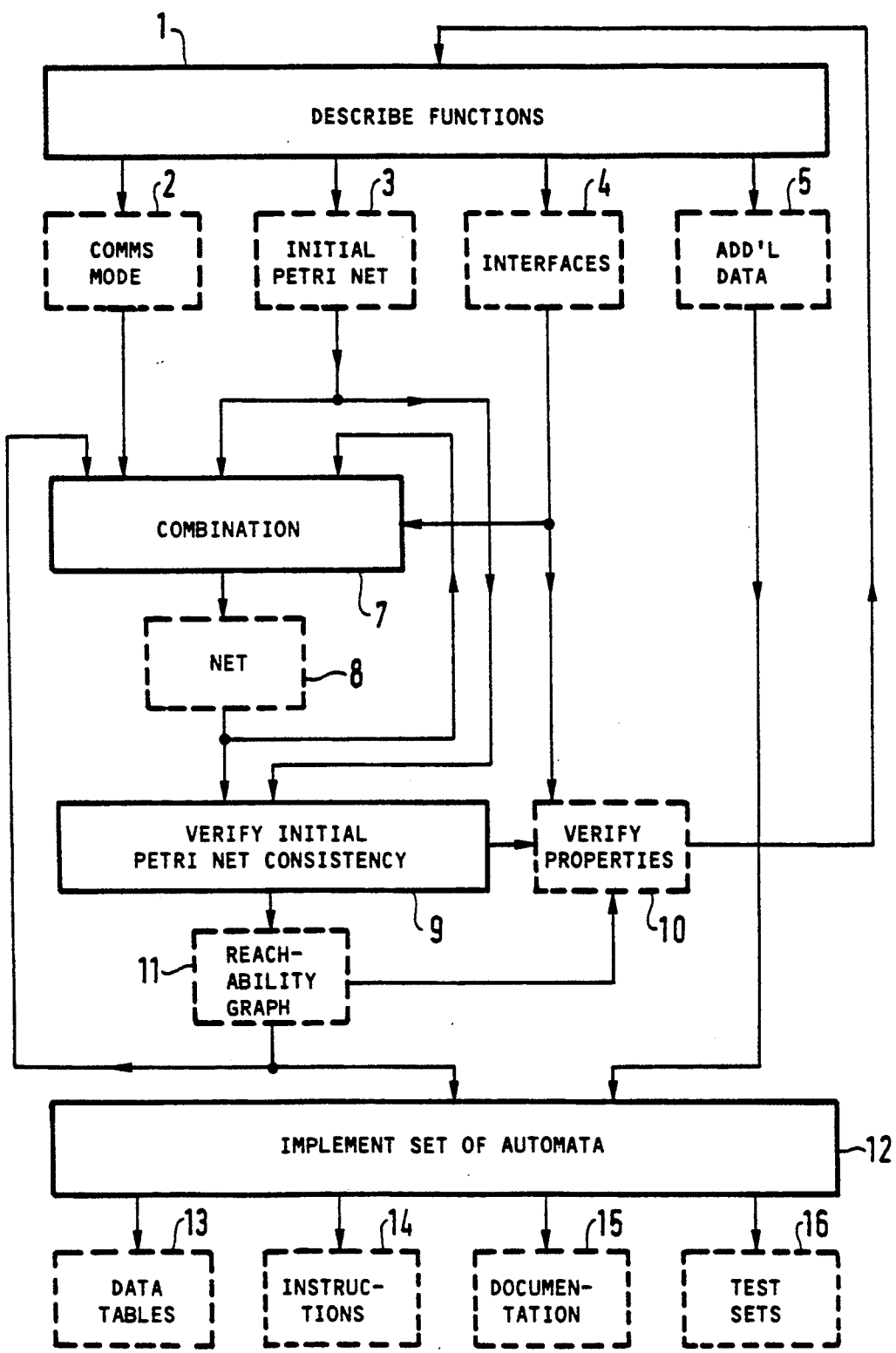
FIG. 1 shows a flowchart of one embodiment of a method in accordance with the invention.

FIG. 1 is a flowchart for one implementation of a method in accordance with the invention as software installed on a development machine comprising a conventional general-purpose computer. How to write the software on the basis of the description given below will be obvious to the man skilled in the art. This implementation is used, for example, to develop a set of communicating automata constituting a call processing application of a switching center. Each function is described by an automaton.

In the first stage 1 of the flowchart the designer describes each function of the application in the form of partial behaviors each modeled by an initial elementary Petri net 3 in the form of interfaces 4 which are interautomaton interfaces or interfaces external to the set of automata, in the form of constraints linking initial nets (called "inter-initial net constraints" hereinafter) and in the form of required properties specific to each automaton. To use the preferred embodiment of the method in accordance with the invention the designer is careful to model each partial behavior by an initial elementary Petri net having only one interface or no interface external to an automaton. Each initial Petri net having an external interface conforms to constraints imposed by interfaces external to the set of automata or by interautomaton interfaces. The definition of each initial net usually represents one call phase. The inter-initial net constraints for each automaton represent the behavior of the environment external to the set.

Each time the designer causes the development machine to combine Petri nets he tells the machine the nets he requires it to combine and the communications mode he requires it to use (2).

During the initial description the designer also describes additional data 5 concerning the actions associated with the transitions and that will be needed during implementation of the software embodying the set of automata to be developed.

The next step is a first analysis 9 to verify the consistency of the initial Petri nets. It verifies the minimal and conventional properties of a Petri net: it must be bounded, live, proper and deadlock-free. If any initial net does not have all these properties, the development machine reports this to the designer so that he can rectify the initial description of the partial behaviors.

The initial description 1 of each Petri net includes describing for each transition of the net the events which fire the transition and the events which are consequences of the transition. Each of these very concise descriptions is in the form of a label assigned to the respective transition, the events being written one after the other and each preceded by the symbol "?" or "!" respectively indicating a firing event or a consequence event.

Figure 2:
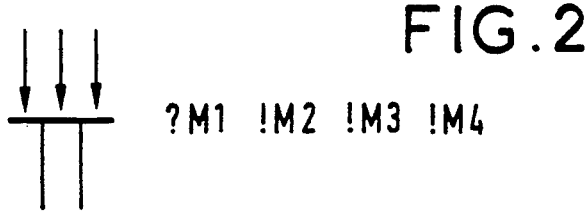
FIG. 2 is a diagram showing a typical transition and the label assigned to it.

FIG. 2 shows by way of example one transition and its label ?M1 !M2 !M3 !M4. This label means that the transition is fired by event M1 and that its consequences are events M2, M3, M4. As will emerge later, comparing the respective labels of two transitions of two different nets indicates how they interact. The labels are therefore a representation of communication between transitions which are not part of the same Petri net. They are used by the development machine to combine Petri nets designated by the designer when he wishes to establish communication between nets to be combined.

Referring to FIG. 1, the next step is to have the development machine carry out a series of combinations 7 and analyses 9. Each combination 7 is followed by an analysis 9 of the resulting net 8 which produces a reachability graph 11, verifies the properties of the resulting net (10) and compares them with the required properties (4).

To facilitate verification of the specific properties of nets resulting from net combination the method further identifies certain events when the designer writes the initial Petri nets. The identified events are eliminated from the reachability graph 11 so that its size can be reduced and it can be interpreted more easily by the designer.

When the three stages of the method have been completed successfully, of the set of automata designed and analyzed in this way can be implemented (12) by establishing the relationship between software tasks and the transitions of a reachability graph. The development machine describes the transitions in the form of structured data tables 13. These transitions can be activated by conventional software (automaton interpreter or multi-automaton interpreter) installed on the target machine. The size of the tables of descriptions of the reachability graph of the Petri net modeling each automaton of the set of automata is usually prohibitive. It is therefore preferable to describe the reachability graph of a plurality of subautomata constituting an automaton to obtain tables of descriptions of reasonable size. The inter-initial net constraints, which are represented by inter-subautomaton constraints, are not implemented because they exist already in the environment external to the set. In the case of implementing a plurality of subautomata it is necessary to provide a mechanism for synchronizing the various subautomata using a dedicated internal queue for this purpose. This queue is that used to combine the subautomata described later with reference to FIG. 8.

Also, the designer implements each action 5 through a series of instructions and the development machine identifies this series of instructions 14 adding as a comment the name of the transition representing this action.

When the software has been coded and compiled, it is validated conventionally by means of test sets 16. These are sequences of events determined from reachability graphs:
either of models representing the various automata constituting the set;
or of models representing the various subautomata constituting each automaton.

Additionally, the implementation stage 12 provides documentation 15 for users of the software implementing the designed set of automata.

Consider the combination stage 7 in more detail. Each combination operation entails combining a plurality of Petri nets. In the preferred embodiment, however, all of the combination operations are implemented using the synchronous communication mode in a first stage and combine exclusively:
two initial nets; or
an initial net and a net replacing initial nets combined previously; or
two replacement nets.

What is more, during this first stage the Petri nets resulting from these combination operations must include at most one interface external to an automaton.

Figure 3:
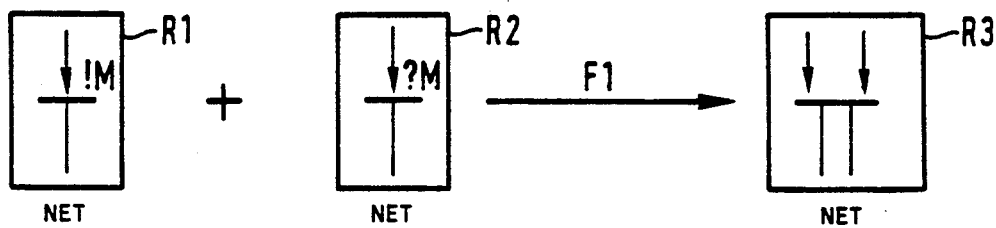
FIGS. 3 through 6 show the synchronous communication mode which is used to combine Petri nets.
Figure 4:
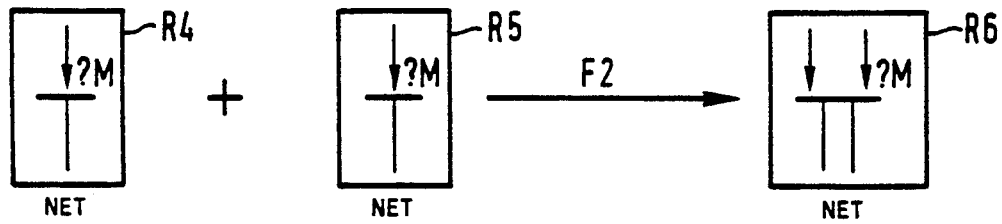
Figure 5:
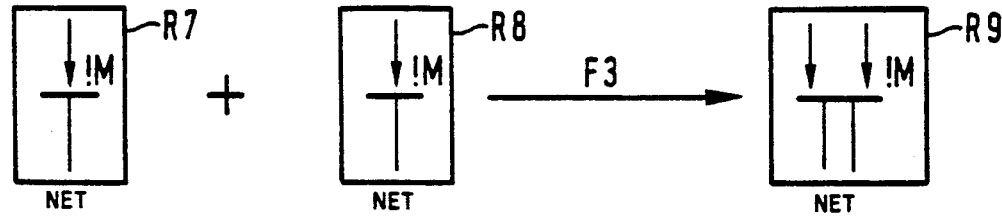

The synchronous communication mode entails merging at least two transitions belonging to two Petri nets to be combined and having a common event in their labels. FIGS. 3 through 5 show the three possible types of transition merger. The designer chooses one type for each merger.

FIG. 3 shows a first type of merger F1. If a Petri net R1 has a transition whose consequence is the event M and if the net R2 has a transition which fires event M, the two nets may be merged by the F1 type merger to constitute a net R3 having a transition which is the result of merging the two transitions in question.

FIG. 4 shows a second type of merger F2. If a net R4 has a transition fired by an event M and if a net R5 has a transition also fired by event M the two nets can be merged into a net R6 having a transition resulting from the merging of the two transitions in question and which is fired by event M.

FIG. 5 shows a third type of merger F3. If a net R7 has a transition whose consequence is an event M and if a net R8 has a transition whose consequence is also the event M then the two nets can be merged to constitute a Petri net R9 having a transition whose consequence is event M.

If each of the nets to be combined further has a transition which is the consequence of or fires the same event, the net replacing the combined net has resulting transitions which are replicated because of the two by two combination of the transitions of the nets to be combined.

Figure 6:
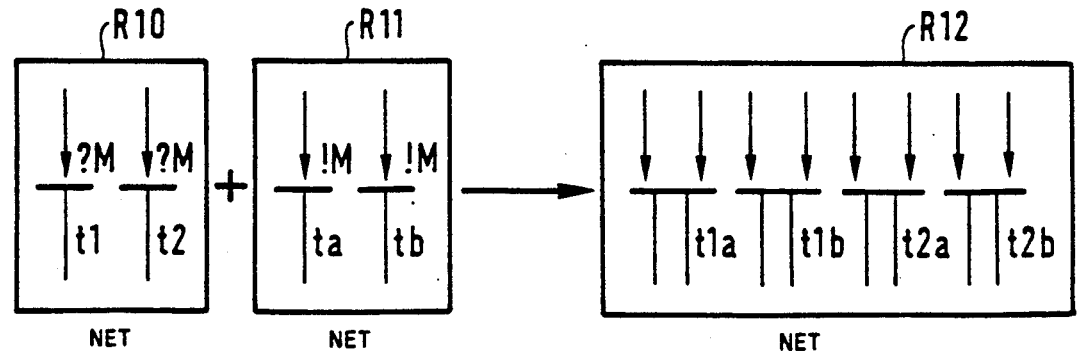

FIG. 6 shows this case. If a net R10 has two transitions t1 and t2 which are fired by the same event M and if a net R11 has two transitions ta, tb whose consequence is the same event M, then it is possible to merge the transitions two by two using the F1 type of merger to obtain a result net R12 having four transitions t1a, t1b, t2a, t2b.

As shown in FIG. 1, after each combination operation 7 a resulting net 8 is subject to an analysis 9 to verify (10) that the properties obtained match the properties required by the designer (4) and to determine a reachability graph 11. The determination and verification are effected simultaneously by the development machine using conventional Petri net computation methods. This analysis is dynamic and exhaustive, i.e. it looks for all possible transitions and states in the net resulting from the combination. It deduces from this graph the general properties of the net and in particular verifies if it is: bounded, safe, live, proper and deadlock-free.

It further determines if the net has the specific properties required by the designer. If the net has all the required specific properties then use of the method may continue. If not, the development machine tells the designer which properties are not verified. The designer modifies the description of the initial nets to remedy this. The reachability graph 11 can be used again for subsequent combination with other Petri nets, either initial nets or nets resulting from previous combinations.

In this preferred embodiment, a second stage of Petri net combination 7 is, for each interface external to the set of automata and for each inter-automaton interface, to effect the combinations using the asynchronous communication mode to combine Petri nets replacing initial nets with each other or with an existing initial net, if any, to obtain from each combination a Petri net modeling communication between two automata or between an interface external to an automaton and the environment of that automaton.

Each of the Petri nets obtained at the end of the first stage represents the behavior of a subautomaton which is part of one of the automata to be designed, even in the case of an existing initial net.

All of the combination operations carried out during the second stage use two queues, one for each communication direction. The two queues are of the "first in, first out" (FIFO) type and are incorporated into the resulting net. This communication mode is used in order to be able to analyze asynchronous dialog between Petri nets and in particular to analyze communication protocols.

Figure 7:
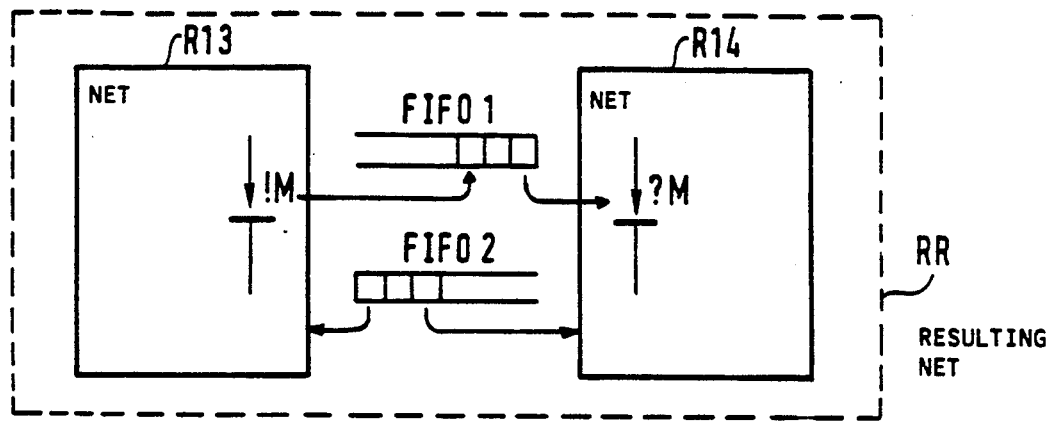
FIG. 7 shows the combination of two Petri nets using the asynchronous communication mode.

FIG. 7 shows the asynchronous communication mode in an example where two nets R13 and R14 communicate by means of two queues FIFO1 and FIFO2, one for each direction, to constitute a resulting net RR. For a better analysis of asynchronous communication between the two nets, communication constraints may entail imposing: signal losses or time-outs; or temporary synchronization (alternate transmission between the two nets); or temporary limitation of the number of waiting events stored in each of the two queues. These constraints are integrated automatically into the Petri nets by the development machine under the control of the designer. The man skilled in the art will find it obvious how to write a program for the development machine implementing this feature of the method in accordance with the invention.

In the preferred embodiment of the invention net combination includes a third stage in which combinations are done using only the pseudo-synchronous communication mode to combine the Petri nets produced by the first stage. The pseudo-synchronous communication mode uses a single "first in, first out" queue and assigns priority to transitions fired by events which are consequences of transitions internal to the nets to be combined over transitions fired by events external to these nets.

This priority scheme and the queue guarantee synchronous communication external to the resulting net but retain asynchronous communication within the resulting net.

Figure 8:
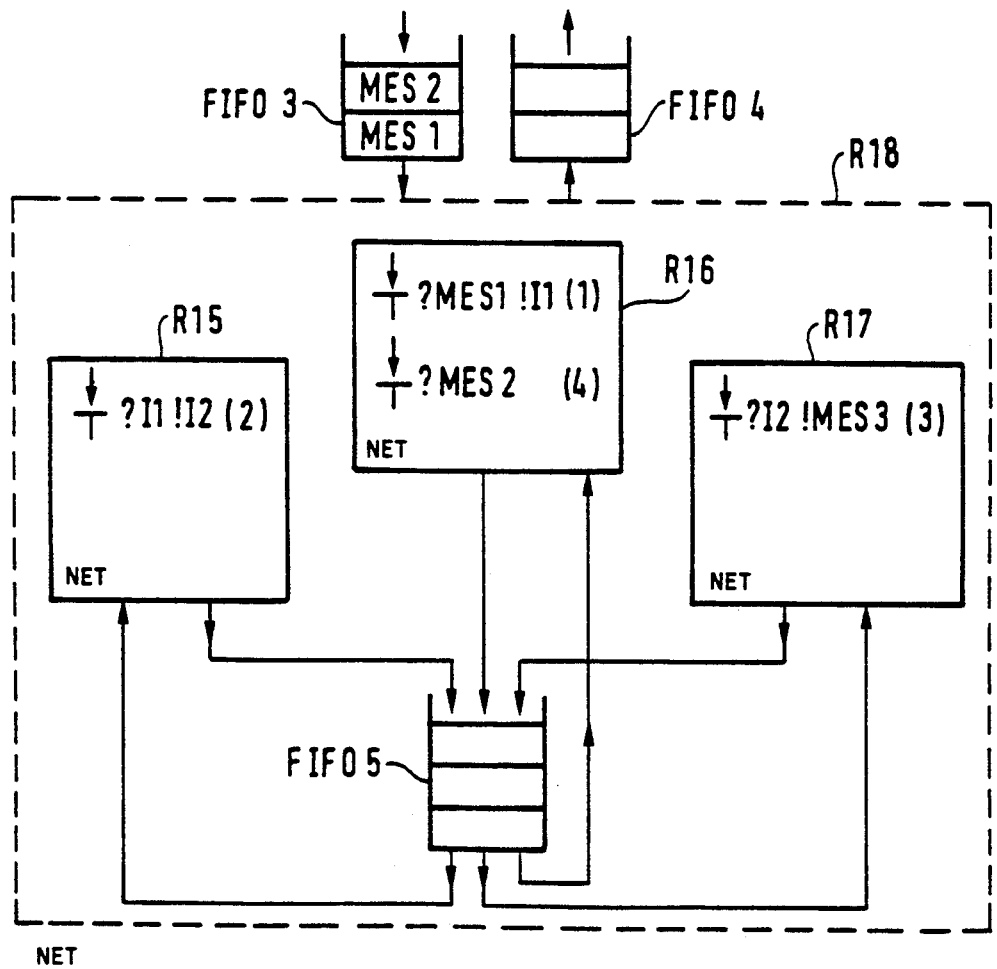
FIG. 8 shows the combination of three Petri nets using the pseudo-synchronous communication mode.

FIG. 8 shows the pseudo-synchronous communication mode. It represents a Petri net R18 resulting from the combination of three Petri nets R15, R16, R17 using a "first in, first out" queue FIFO5 and which is incorporated in the resulting net R18. This resulting net has an interface linking it to the remainder of the set of automata and to the environment external to the set consisting of an input queue FIFO3 and an output queue FIFO4, for example. The queue FIFO5 has three inputs connected to three respective outputs of the nets R15 through R17 and three outputs connected to three respective inputs of the nets R15 through R17. Each event which is the consequence of a transition in one of the nets R15, R16, R17 and which fires another transition in one of these nets passes through the queue FIFO5. These events will therefore react on the nets R15, R16, R17 in the order in which they are written into the queue FIFO5. This queue, and its priority, keep communication synchronous with events external to the resulting net R18.

In this example the net R15 includes a transition fired by an event I1 and having as a consequence an event I2. net R16 includes a first transition fired by an event in the form of a message MES1 received via the interface and this transition has for a consequence an event I1. The net R16 has a second transition fired by an event in the form of a message MES2 and which has no consequence. The net R17 has a transition which is fired by the event I2 and which has for a consequence an event in the form of a message MES3.

In FIG. 8 the numbers in brackets indicate the order in which the transitions are fired according to the priority rule. At the time in question the messages MES1 and MES2 have just been written into the input queue FIFO3 of the interface of the resulting net R18. The first transition of the net R16 is fired by the message MES1 which is read first in the input queue FIFO3. The consequence of this transition is the event I1. The latter fires immediately the transition of the net R15 because it takes priority over reading the message MES2. A consequence of this transition, which is the second transition since the messages arrived, is the event I2. The event I2 also takes priority over reading the message MES2. It fires the transition of the net R17 whose consequence is an event in the form of the sending of a message MES3 which is written in the output queue FIFO4. There is no further internal interaction possible for the time being and the priority rule authorizes reading of the next message MES2 which is stored in the input queue FIFO3. The message MES2 is an event which fires the second transition of the net R16. The order in which the external messages are processed is therefore: MES1, MES3, MES2. The message MES2 does not fire the second transition of the net R16 until the message MES1 has been processed completely, i.e. after firing the first transition of R16 and then the transition of R15 and then the transition of R17. Communication between the nets R15, R16, R17 is therefore globally asynchronous within the resulting net R18 but communication with the exterior is synchronous.

Figure 10B:
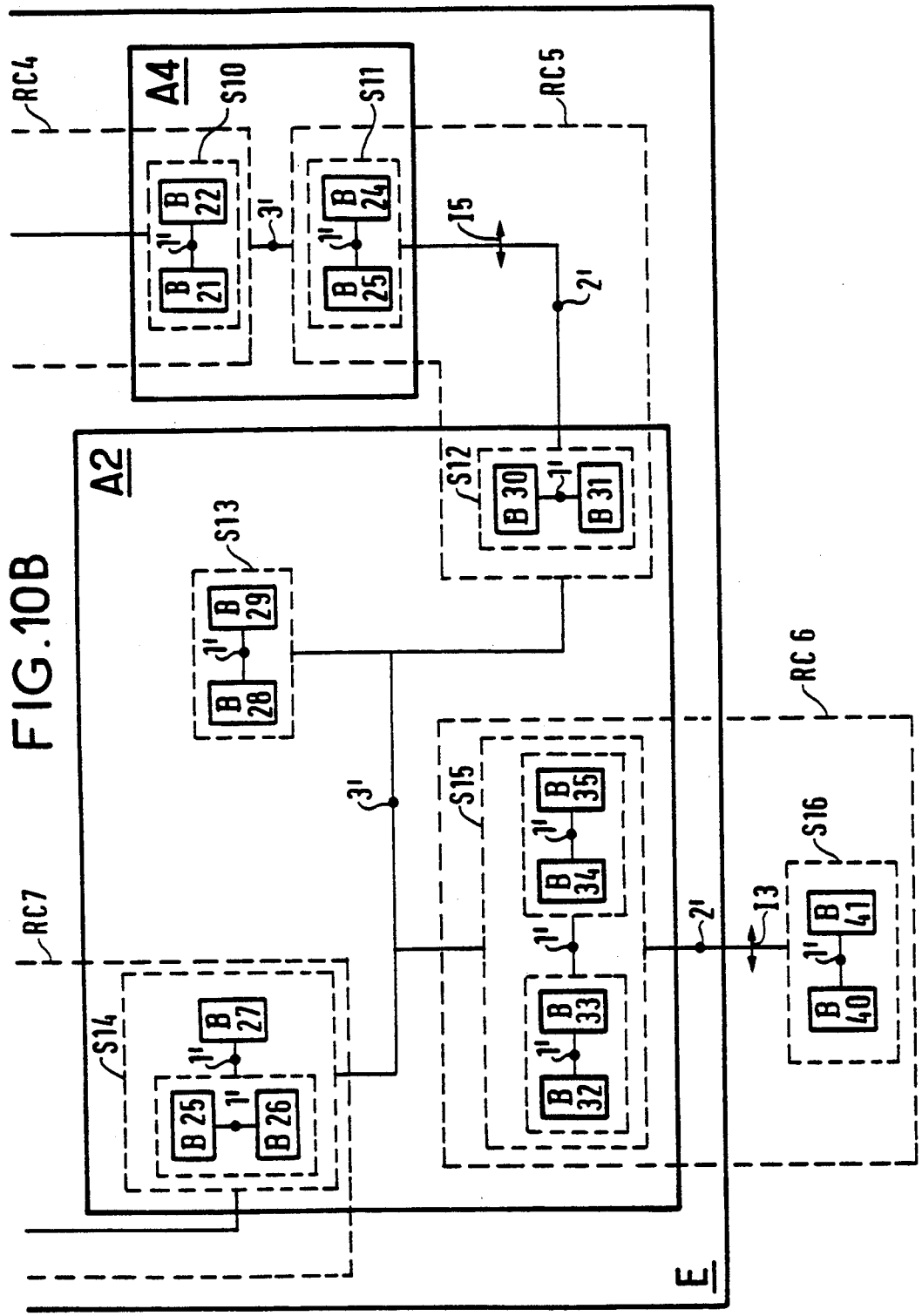

FIGS. 9, 10a and 10b show one use of the preferred embodiment of the invention to assist with the development of a set E of communicating automata comprising external interfaces I1, I2, I3 and interautomaton internal interfaces I4 through I7. The interfaces I1, I2, I3 are respectively interfaces external to the automata A1, A3, A2. The automata A1 and A3 are linked by the inter-automaton interface I7. The automata A2 and A4 are linked by the inter-automaton interface I4. The automata A3 and A4 are linked by the inter-automaton interface I5. The automata A2 and A1 are linked by the inter-automaton interface I6.

At the outset the designer knows the functions implemented by the environments of the external interfaces I1, I2, I3 and the functions that each of the automata A1, A2, A3, A4 of the set must implement. The function of each of these environments and automata can be broken down into partial behaviors. The designer describes each of these partial behaviors by means of an elementary Petri net, i.e. a net comprising only a few transitions and a few places.

This description entails supplying the development machine with a label for each transition containing a firing event and a list of the events which are the consequences of the transition, annotated in the manner described previously with reference to FIG. 2. In principle, there cannot be two transitions in the same initial Petri net fired at the same time by the same event. However, the Petri net technique and the method in accordance with the invention do not rule out the design and use of an initial Petri net comprising a plurality of transitions that can be fired at the same time by the same event. Such transitions are called "indeterministic". However, additional conditions are required to resolve the indeterminacy in respect of the choice of firing of these transitions at the time of implementation of the set of automata.

The events which constitute the labels of the initial elementary Petri nets are: events representing the external interfaces I1, I2, I3; events representing the inter-automaton interfaces I4 through I7; events representing the initial inter-net interfaces; and events internal to an automaton implementing a choice between indeterministic transitions.

The designer further supplies the development machine with a description of inter-initial net constraints representing the behavior of the environment external to the set E of automata and a description of the properties required of the initial elementary Petri nets and also of the Petri nets resulting from previous combinations. These required properties are the consistency of the Petri nets and properties specific to each net.

The designer also supplies the development machine with a description of the initial Petri nets respectively modeling the behavior of the environment external to each of the external interfaces I1, I2, I3 of the set E of automata. In the preferred embodiment of the method in accordance with the invention the designer designs the initial Petri nets so that each comprises at most one interface external to an automaton and controls the combination of the initial nets by the first and second stages described previously.

FIG. 10, obtained by combining FIGS. 10a and 10b, is a schematic representation of the initial Petri net and the combination operations carried out to design the set E of automata shown in FIG. 9. The combination operations of the first stage are all identified by the reference number 1', those of the second stage are all identified by the reference number 2' and those of third stage are all identified by the reference number 3'.

The first stage combines the initial Petri nets two by two using the synchronous communication mode and verifies that the resulting nets have the required properties to obtain Petri nets comprising at most one interface external to an automaton. In the automaton A1, for example, the partial behaviors of which are modeled by elementary Petri nets B1 through B13, the first stage is:
to combine the initial nets B1 and B2 to obtain a resulting net P1; and
to combine the resulting net P1 with the initial net B3 to obtain a resulting net S2 which has a single interface I1 external to the automaton A1.

All the nets B1, B2, B3 which have the external interface I1 have been combined. The resulting net S2 represents a subautomaton that will be used during the second stage of the method.

The method then entails:
combining the initial nets B4 and B5 to obtain a resulting net B2;
combining the initial nets B6 and B7 to obtain a resulting net P3; and
combining the two resulting nets P2 and P3 to obtain a resulting net S3.

All the nets B4, B5, B6, B7 which have I6 for their interface external to the automaton A1 have been combined. The resulting net S3 therefore represents a subautomaton.

The method then entails:
combining the initial nets B8 and B9 to obtain a resulting net P4; and
combining the resulting net P4 with the initial net B6 to obtain a resulting net S5.

All the nets B8, B9, B10 which have I7 for their external interface have been combined. The resulting net S5 therefore represents a subautomaton.

The method then entails combining the initial nets B12 and B13 to obtain a resulting net S4 which has no interface external to the automaton A1. There remains an initial net B11 which has not been combined but, in this example, the designer chooses deliberately not to combine it. The resulting net S4 and the remaining initial net B11 also represents subautomata as they are part of nets resulting from the first stage of the method.

Similarly, for the automaton A2 the first stage of the method comprises:
combining in two stages initial elementary Petri nets B25, B26, B27 to obtain a subautomaton S14 having an interface I6 external to the automaton A2;
combining two initial elementary Petri nets B28 and B29 to obtain a subautomaton S13 which has no interface external to the automaton A2;
combining two initial Petri nets B30 and B31 to obtain a subautomaton S12 which has an interface I5 external to the automaton A2; and
combining in three stages the Petri nets B32, B33, B34, B35 to obtain a subautomaton S15 having an interface I3 external to the automaton A2 and external to the set E.

For the automaton A3 the first stage of the method comprises:
combining the initial elementary Petri nets B14 and B15 to obtain a subautomaton S7 having an interface I2 external to the automaton A3 and external to the set E;
combining in two stages the elementary Petri nets B16, B17, B18 to obtain a subautomaton F8 having an interface I7 external to the automaton A3; and
combining the initial elementary Petri nets B19 and B20 to obtain a subautomaton S9 having an interface I4 external to the automaton A3.

For the automaton A4 the first stage comprises:
combining two initial Petri nets B21 and B22 to obtain a subautomaton S10 having an interface I4 external to the automaton A4; and
combining two initial elementary Petri nets B23 and B24 to obtain a subautomaton S11 having an interface I5 external to the automaton A4.

For the respective environments of the interfaces I1, I2, I3 external to the set E of automata the first stage comprises:
combining two elementary Petri nets B36 and B37 respectively modeling partial behaviors of the environment external to the interface I1 to obtain a subautomaton S1 having a single interface, namely the interface I1;
combining two initial Petri nets B38 and B39 which respectively represent partial behaviors of the environment external to the interface I2 external to the set E to obtain a subautomaton S6 having a single interface, namely the interface I2; and combining two elementary Petri nets B40 and B41 respectively modeling partial behaviors of the environment external to the interface I3 external to the set E to obtain a subautomaton S16 having a single interface, namely the interface I3.

The second stage of the method for each interface external to an automaton, i.e. inter-automaton interfaces and interfaces external to the set E, comprises combining two by two using the asynchronous communication mode nets S1 through S16 from the first stage having a common inter-automaton interface or interface external to the set of automata and verifying that the net obtained has the properties required by the designer. The designer tells the machine the two nets to be combined and indicates that they must be combined using the asynchronous communication mode. Each combination operation supplies a resulting Petri net which models communication between two inter-automaton interfaces or between an interface external to an automaton and the environment of that automaton. If the development machine notes that the net resulting from a combination operation does not have the required properties, it reports this to the designer who must modify some initial Petri nets and repeat the first stage for the nets which have been combined and for which the resulting net does not have the required properties.

In this example, the second stage therefore comprises:

combining the subautomaton S1 which models the environment external to the interface I1 external to the set E and the subautomaton S2 of the automaton A1 to obtain a resulting net RC1 modeling communication between the automaton A1 and the environment external to the set E via the external interface I1;

combining the subautomaton S6 modeling the environment external to the interface I2 with the subautomaton S7 of the automaton A3 to obtain a resulting net RC2 modeling communication between the automaton A2 and the environment external to the set E via the interface I2;

combining the subautomaton S16 modeling the environment external to the interface I3 with the subautomaton S15 of the automaton of the automaton A2 to obtain a resulting net RC1 modeling communication of the automaton A2 with the environment external to the set E via the interface I3;

combining the subautomaton S5 of the automaton A1 with the subautomaton S8 of the automaton A3 to obtain a resulting net RC3 modeling communication between the automata A1 and A3 via the interface I7;

combining the subautomaton S9 of the automaton A3 with the subautomaton S10 of the automaton A4 to obtain a resulting net RC4 modeling communication between the automata A3 and A4 via the interface I4;

combining the subautomaton S11 of the automaton A4 with the subautomaton S12 of the automaton A2 to obtain a resulting net RC5 modeling communication between the automata A2 and A4 and via the interface I5;

combining the subautomaton S14 of the automaton A2 with the subautomaton S3 of the automaton A1 to obtain a resulting net RC7 modeling communication between the automata A1 and A2 via the interface I6.

When all the resulting nets produced in the second stage have the properties required by the designer, inter-automaton communication and communication with the environment external to the set E may be regarded as validated. The designer then proceeds to the third stage. This comprises combination using the pseudosynchronous communication mode to combine Petri nets modeling subautomata produced in the first stage and validated in the second stage until there is obtained for each automaton a Petri net modeling the function of that automaton, in particular communications between the subautomata which constitute that automaton. The Petri nets S1, S6, S16 have been used to model communications with the environment external to the set E but they are not part of the set of the automata A1 through A4. They are therefore ignored in the third stage.

In this example the third stage comprises:

combining the subautomata S2, S3, S4, S5 and B11 to obtain a resulting Petri net modeling all of the automaton A1;

combining the subautomata S7, S8, S9 to obtain a resulting net modeling the automaton A3;

combining the subautomata S10 and S11 to obtain a resulting net modeling the automaton A4; and combining the subautomata S12, S13, S14, S15 to obtain a resulting net modeling the automaton A2.

When all the resulting nets produced by this third stage have the properties required by the designer, development of the automata may be considered complete. It remains only to implement these automata, preferably by implementing the subautomata rather than the automata themselves, in the form of structured data tables describing the transitions of these subautomata. These data tables are deduced conventionally from the reachability graph determined during the analysis of each of the Petri nets obtained in the first stage and validated during the second stage.

Implementation further comprises: implementing asynchronous and pseudo-synchronous communications used to combine the nets during the second and third stages in the form of series of instructions and implementing an automaton engine for each automaton, this engine using the data tables and the series of instructions to implement the automaton. How to write software implementing these automaton engines will be obvious to the man skilled in the art.

The scope of the invention is not limited to a set of automata implemented in software. A set of automata developed using the method in accordance with the invention may also be implemented in the form of a hardwired or microprogrammed logic circuit.

There is claimed:

1. Method for assisting with the development of a set of communicating automata comprising a plurality of interfaces which process a plurality of interleaved messages, said automata being developed from interfaces external to the set, inter-automaton interfaces, the function that each automaton of the set must implement and the function to be implemented by the environment external to each interface external to the set, which method comprises the following stages:

supplying to a development machine a description of initial elementary Petri nets respectively modeling partial behaviors of each function by describing events which fire or are consequences of transitions in each initial Petri net and assigning a label to each transition dependent on at least one event, each event firing or being a consequence of said transition, said events representing interfaces external to the set of automata, inter-automaton interfaces and interfaces between the initial Petri nets;

verifying on said development machine that each initial Petri net has required properties;

supplying to said development machine a description of constraints between initial Petri nets representing the behavior of the environment external to the set of automata;

notifying to said development machine a plurality of Petri nets to be combined and a communication mode to cause it to combine initial Petri nets with each other or with modified Petri nets replacing initial Petri nets previously combined or to combine initial or modified Petri nets replacing initial Petri nets previously combined, each combination being effected by causing to communicate at least two initial or modified Petri nets using the labels of their transitions in the notified communication mode, which is chosen from the following modes:

a synchronous mode;

an asynchronous mode;

a pseudo-synchronous mode in which events constituting communication with the environment external to the Petri net resulting from the combination are synchronous with the environment external to the Petri nets to be combined and asynchronous within the Petri nets to be combined, each pseudo-synchronous mode combination allowing for inter net constraints;

causing said development machine to verify that the Petri net resulting from said combination has the required properties;

supplying to the development machine a description of modified initial Petri nets replacing initial Petri nets to be combined if the Petri net obtained by combining the initial Petri nets does not have the required properties; and notifying again to said development machine a plurality of Petri nets to be combined and a communication mode to cause it to carry out a series of combinations and verifications until modified Petri nets are obtained having the required properties and respectively modeling each communication between two inter-automaton interfaces or between an external interface and the environment external to the set of automata and each automaton of the set.

2. Method according to claim 1 wherein the combination of a plurality of Petri nets using the synchronous communication mode comprises merging all transitions belonging to two nets to be combined and whose labels share a common event which:

is a consequence of one of the transitions and fires another transition; or is a common consequence of the transitions; or fires all the transitions.

3. Method according to claim 1 wherein the combination of a plurality of Petri nets using the asynchronous communication mode comprises:

linking a first Petri net and a second Petri nets Petri to be combined by means of a respective queue in each of two communication directions; and imposing temporary constraints on a communication protocol using the two queues throughout the duration of the verification of the required properties of the resulting Petri net obtained by combining the two nets to be combined and the first and second Petri queues.

4. Method according to claim 1 wherein the combination of a plurality of Petri nets using the pseudosynchronous communication mode comprises:

linking said initial or modified Petri nets using a single queue having a plurality of inputs respectively connected to an output of each of the Petri nets to be combined and a plurality of outputs respectively connected to an input of each of the Petri nets to be combined;

imposing a permanent constraint giving events from said queue priority over events from interfaces external to the Petri net obtained to fire transitions in the nets to be combined; and imposing temporary inter-net constraints only during the verification of the properties required of the Petri net modeling the behavior of an automaton and consisting in adding conditions for firing transitions of one of the Petri nets to be combined, these conditions relating to the status of the other Petri nets to be combined and representing the behavior of the environment of the resulting Petri net.

5. Method according to claim 1 wherein said initial Petri nets each comprise at most one interface external to an automaton and the combination of initial elementary Petri nets comprises the following three stages in this order:

a first stage comprising combining initial or modified Petri nets two by two using the synchronous communication mode to obtain modified Petri nets replacing initial Petri nets and comprising at most one interface external to an automaton; verifying that the Petri nets obtained have the required properties; and repeating the first stage for Petri nets which have been combined where the resulting Petri net does not have the required properties:

a second stage comprising, for each interface external to an automaton: combining two by two using the asynchronous communication mode Petri nets obtained from the first stage and having a common inter-automaton interface or interface external to the set of automata to obtain from each such combination a Petri net modeling communication between two inter-automaton interfaces or between an interface external to an automaton and the environment of the set of automata; verifying that the Petri nets obtained have the required properties; and repeating the first stage for Petri nets that have been combined and for which the resulting net does not have the required properties; and a third stage comprising: using the pseudosynchronous communication mode to combine Petri nets obtained from the first stage and validated by the second stage allowing for inter-initial net constraints representing the behavior of the environment external to the set to obtain for each automaton a Petri net modeling the function of said automaton, in particular communication between the Petri nets obtained from the first stage; verifying that the Petri nets obtained have the required properties; and repeating the first and second stages for Petri nets which have been combined and for which the resulting net does not have the required properties.

6. Method according to claim 5 wherein implementation of the automata further comprises:

implementing the Petri nets obtained from the first stage in the form of data tables describing the transitions of the automata made up of subautomata respectively modeled by each of said Petri nets;

implementing the asynchronous and pseudosynchronous mode communications used to combine said Petri nets by series of instructions;

implementing an automaton engine for each automaton using said data tables and said series of instructions to implement said automaton.

7. Method according to claim 1 wherein to facilitate verification of the specific properties of Petri nets resulting from the combination of nets it further comprises identifying certain events when the designer describes the initial Petri nets and eliminating the events thus identified in a reachability graph of each Petri net resulting from a combination determined during verification that the Petri net has the required properties.

* * * * *